United States Patent [19]

Weaver

[11] 4,448,934
[45] May 15, 1984

[54] BLENDS OF IONIC ELASTOMERS AND NYLON

[75] Inventor: Ebon P. Weaver, Naugatuck, Conn.

[73] Assignee: Uniroyal, Inc., New York, N.Y.

[21] Appl. No.: 345,270

[22] Filed: Feb. 2, 1982

[51] Int. Cl.$^3$ .................. C08F 27/06; C08L 23/32
[52] U.S. Cl. ............................ 525/184; 524/399
[58] Field of Search .................. 525/184; 524/399

[56] References Cited

U.S. PATENT DOCUMENTS 3,642,728  2/1972  Canter .............................. 260/762
4,137,203  1/1979  Makowski et al. .............. 524/399
4,251,644  2/1981  Joffrion ............................ 525/184

Primary Examiner—John C. Bleutge
Assistant Examiner—A. L. Carrillo
Attorney, Agent, or Firm—Marvin Bressler

[57] ABSTRACT

Blends of nylon and an elastomer containing neutralized sulfonated ethylene propylene diene rubbers (EPDM) and a preferential plasticizer and a process for the preparation thereof. The blend preferably comprises from 5 to 60 wt. % of the elastomer and forms compositions having high impact resistance.

4 Claims, 2 Drawing Figures

BLENDS OF IONIC ELASTOMERS AND NYLON

BACKGROUND OF THE INVENTION

It has long been desired to improve Nylon's impact resistance. It has been proposed that nylon be modified to form a toughened, multi-phase, thermoplastic composition in U.S. Pat. No. 4,174,358. In such patent, the major phase is a polyamide resin, the other phases being an added polymer of proper particle size and suitable modulus which is adhered to the polyamide matrix resin. A variety of such added polymers are listed on column 6 of the aforesaid patent. However, according to the teaching of this patent, at 20% carbonate modified EPDM concentration, ⅛" notched Izod specimens did not exceed 15 ft.-lb./in. of notch according to ASTM D-256-56 when measured at room temperatures. This impact resistance is insufficient for many contemplated applications. Other patents which show the modification of nylon, but which are outside of the scope of the invention are: U.S. Pat. Nos. 3,465,059; 3,845,163; and 3,388,186.

DESCRIPTION OF THE INVENTION

It has been discovered that nylon and an elastomer containing neutralized sulfonated EPDM and a preferential plasticizer may be admixed in a broad range of weight ratios to form a composition having better impact properties than prior art compositions. Broadly, the two components may be mixed with from 1 to 99 wt. % of each in the total composition. Preferably, the mixture contains from about 5 to 60% of the elastomer, based on the total mixture. Initially, masterbatches can be made of these materials. The elastomer/nylon ratio should be such that, when the masterbatch is subsequently blended with additional nylon at the processing machine, the total blend has a mix ratio within the above range. Examples of shaped articles which may be used with the compositions of the invention are machine covers, transport cases, and wheels. Toughness (impact resistance) is maintained at low temperatures, as are good structural properties such as tensile strength, elongation, and flexural modulus.

Figure 1:
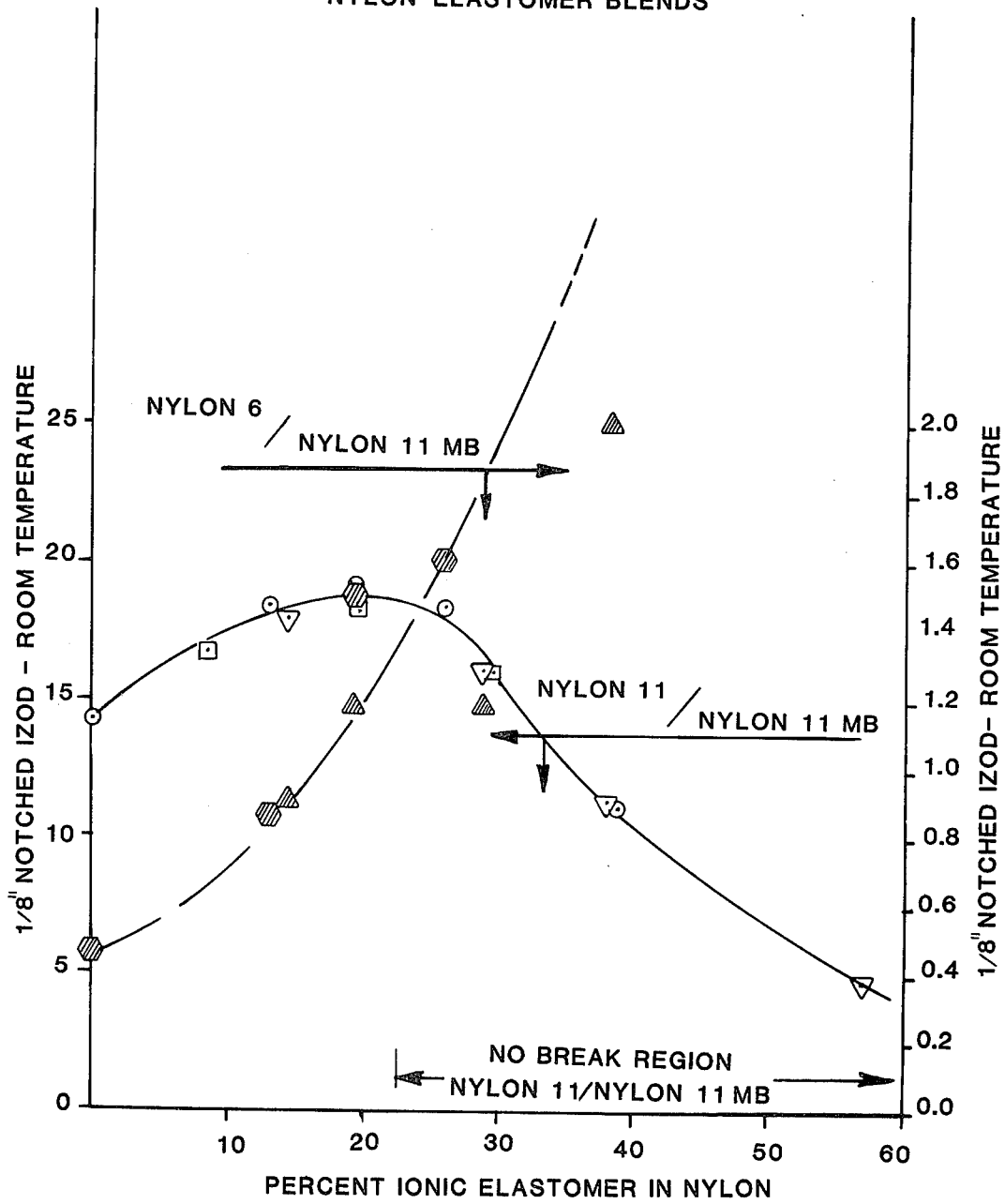
FIG. 1 is a graphic representation of the impact resistance at room temperature of various blends within the scope of the subject invention.

The neutralized sulfonated EPDMs which may be used in the practice of the invention are well-known articles of commerce. Their preparation is taught in U.S. Pat. No. 3,642,728, which is incorporated herein by reference. Basically, the olefinic unsaturation sites of an elastomeric polymer are selectively sulfonated to form an acidic sulfonated elastomeric polymer. Sulfonation may be performed by means of complex sulfur-trioxide donor or a Lewis base. The sulfonate groups may be readily neutralized by a basic material at room temperature to form the ionically crosslinked elastomers. The basic material used as a neutralizing agent may be selected from organic amines or basic materials selected from groups 1 through 8 of the Periodic Table or mixtures thereof.

In the presence of preferential plasticizers and under conventional processing conditions (high temperature and high shear force), the ionic association is dissipated, thereby forming a reprocessable elastomer. The preferential plasticizers used in the composition are well known in the art and taught in U.S. Pat. No. 3,847,854, the disclosure of which is incorporated by reference herein. Most preferably, zinc stearate is used as the preferential plasticizer. From 5 to 50 parts per hundred of elastomer may be used, preferably from 6 to 16 parts per hundred, and most desirably from 8 to 10 parts per hundred. The term "elastomer" as used herein includes compositions of the neutralized sulfonated EPDM, the preferential plasticizer and other conventional compounding ingredients, such as antioxidants.

With respect to the nylon compositions, these are well known in the art and include semi-crystalline and amorphous resins having molecular weight of at least 5,000. Suitable polyamides include those described in U.S. Pat. Nos. 2,071,250; 2,071,251; 2,130,523; 2,130,948; 2,241,322; 2,312,966; 2,512,606; and 3,393,210. The polyamide resin can be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Examples of polyamides include polyhexamethylene adipamide (66 nylon), polyhexamethylene azelaamide (69 nylon), polyhexamethylene sebacamide (610 nylon), and polyhexamethylene dodecanoamide (612 nylon), the polyamide produced by ring opening of lactams, i.e., polycaprolactam, polylauric lactam, poly-11-amino-undecanoic acid, bis(-paraaminocyclohexyl) methane dodecanoamide. It is also possible to use in this invention polyamides prepared by the copolymerization of two of the above polymers or terpolymerization of the above polymers on their components, e.g., an adipic, isophthalic acid hexamethylene diamine copolymer. Preferably the polyamides are linear with a melting point in excess of 200° C. The term "nylon" as used herein refers to nylon containing conventional compounding ingredients as are known to those skilled in the art.

A Banbury mixer may be conveniently used for forming the blends of the invention. On the other hand, in the case of compositions with high nylon concentrations, an extruder is preferable. The product from the Banbury or the extruder, as the case may be, is chilled, cut into pellets and, after drying, molded. It should be understood that other blending techniques may be used. It is important that the mixer can be operated at a temperature of from 10° to 40° F. hotter than the melting point of the nylon. Such mixers may be screw-injection molding machines, compounding extruders, plastics extruders, or other shear mixers known to those skilled in the art. Dispersion and compatibility are necessary to obtain maximum impact of the finished product. Some improvement can be obtained even in low shear mixing, but this is not preferred. To obtain the best quality compositions, both the nylon and the elastomer should be dried before compounding or processing. Additionally, where a high melting nylon is used, a nitrogen blanket is helpful to preserve color and retard degradation.

To more clearly illustrate the invention, attention is directed to the following examples:

EXAMPLE 1

One hundred parts of a neutralized sulfonated EPDM (Uniroyal's Ionic Elastomer 2590) is compounded with 8 parts of zinc stearate and 0.5 part of tetrakis methylene (3,5-ditert-butyl-4-hydroxhydro-cinnamate)methane, an antioxidant. This elastomer is blended to form two masterbatches. The first, hereinafter Masterbatch B, is composed of 60 parts of the elastomer and 40 parts of nylon 11 (BESNO 40 PTL nylon, a trademark of Rilsan Corporation). The second masterbatch, hereinafter Masterbatch A, is formed from 40 parts of the aforesaid elastomer and 60 parts of the nylon 11.

To prepare the masterbatch, the ingredients are added to a Banbury heated to 250° F. and mixed at high speed until EPDM, mixing is complete. The batch is then passed through a 330° mill set at ¼". The blended composition is cut and ground. Thereafter, Masterbatches A and B, respectively, are mixed with varying quantities of pellets of nylon 6 in the throat of a screw-fed injection molding machine. The machine barrel temperature is set at about the melt temperature of the nylon, so that the temperature of the melt on injection is 10° to 40° F. hotter than the melting temperature of the nylon. Complete dispersion is achieved in the screw of the molding machine.

Table 1 shows the notched impact resistance (ft.lb./in. notch) at room temperature and at −40° F. of ⅛" strips of nylon 6 and various blends of the invention made from Masterbatches A and B.

TABLE 1

|  | Nylon 6 | Masterbatch A | | | Masterbatch B | |
|---|---|---|---|---|---|---|
| % Elastomer in Final Mix | 0 | 5 | 10 | 15 | 5 | 10 |
| ⅛" Notched Izod at room temperature | 0.4 | 0.8 | 1.3 | 1.4 | 1.0 | 1.4 |
| ⅛" Notched Izod at −40° F. | 0.4 | 0.5 | 0.6 | 0.6 | 0.7 | 0.7 |

The above table shows a marked increase in impact resistance of the compositions of the invention in comparison to the prior art. In the samples where the final composition contained 10 and 15 parts per hundred of the elastomer, the increase of impact resistance at room temperature is in excess of three-fold. It should also be noted that the blends formed from Masterbatch B, at comparable elastomer contents, are consistently better than those obtained from Masterbatch A.

EXAMPLE 2

This example shows the effect of using the same type of nylon in forming the masterbatch as is added to form the final blend (a compatible system). Using the same procedures as shown in Example 1, the following results are obtained:

TABLE 2

|  | Nylon 11 | Masterbatch A | | Masterbatch B | |
|---|---|---|---|---|---|
| % Elastomer in Final Mix | 0 | 8.3 | 19.6 | 38.4 | 29.3 | 57.1 |
| ⅛" Notched Izod at room temperature | 1.16 | 16.7 | 18.2 | NB | 15.9 | NB |
| ⅛" Notched Izod at −40° F. | 0.3 | 2.4 | 2.8 | 13.4 | 20 | NB |

NB = No Break. The impacting weight deformed the sample without breaking it.

The above data clearly show that exceptional improvement is obtained when combining compatible matrix polymers.

EXAMPLE 3

In order to further elucidate the subject invention, particularly with respect to the question of nylon compatibility and the percent ionic elastomer in the composition, additional test runs were performed. The results obtained are set forth on FIGS. 1 and 2 attached thereto.

Figure 2:
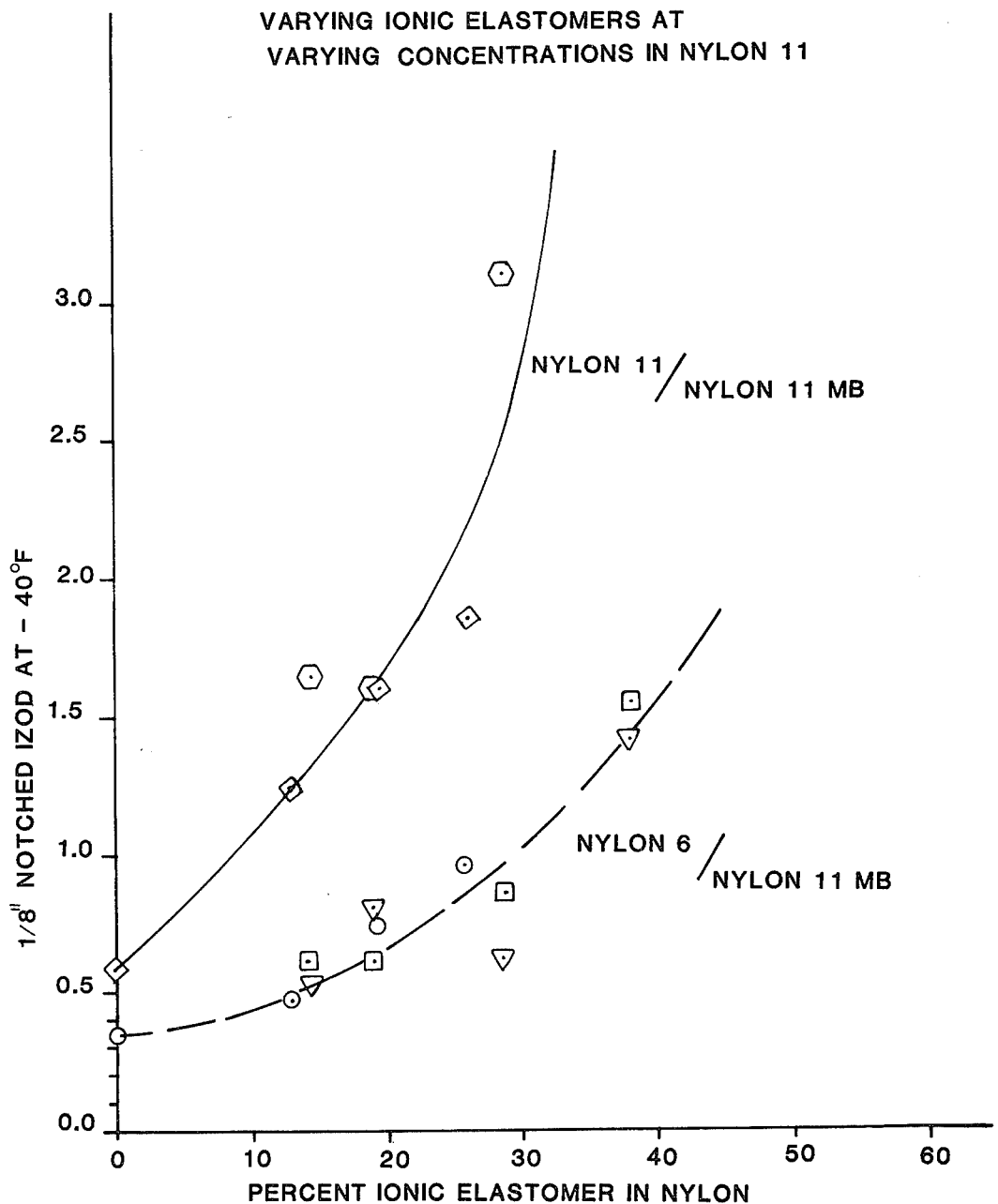
FIG. 2 is a graphic representation of the effect of the percent elastomer in the compositions of the invention on impact resistance at −40° F. and the effect of compatibility on impact strength.

As shown in FIG. 1, when nylon 11 is the sole nylon used and the elastomer concentration increases over 20%, the impact resistance decreases. This indicates that the polymer begins to gain flexibility. Such polymers, those with increased flexibility, would not be useful as toughened nylon, but would have application, because of improved tensile strength, as hose or wire-covering compounds, where ease of processing is important. In the case of the other curve in FIG. 1 and the curves in FIG. 2, it is clear that the impact resistance is markedly increased as the elastomer concentration increases.

Having thus described my invention, what I claim and desire to protect by Letters Patent is:

1. A polymeric blend which comprises an admixture of:
   5 to 60 parts of an ionically crosslinked elastomer containing neutralized sulfonated EPDM;
   40 to 95 parts of nylon 1; and
   5 to 50 parts, per 100 parts of said elastomer, of zinc stearate;
   all said parts being by weight.

2. A blend in accodance with claim 1 wherein said zinc stearate is present in a concentration of 6 to 16 parts by weight per 100 parts by weight of said elastomer.

3. A blend in accordance with claim 2 wherein said zinc stearate is present in a concentration of 8 to 10 parts by weight per 100 parts by weight of said elastomer.

4. A process for preparing a polymeric blend which comprises preparing a masterbatch consisting essentially of 40 to 60 parts of nylon 11 and correspondingly 60 to 40 parts of an ionically crosslinked elastomer containing a neutralized sulfonated EPDM and 5 to 50 parts of zinc stearate per 100 parts of said ionically crosslinked elastomer, admixing said masterbatch with nylon 11 to produce a blend which includes 5 to 60 parts of said ionically crosslinked elastomer and 40 to 95 parts of said nylon 11, all said parts being by weight.

* * * * *

UNITED STATES PATENT AND TRADEMARK OFFICE
CERTIFICATE OF CORRECTION

PATENT NO. : 4,448,934

DATED : May 15, 1984

INVENTOR(S) : Ebon P. Weaver

It is certified that error appears in the above-identified patent and that said Letters Patent are hereby corrected as shown below:

Column 4, line 40 reading "nylon 1" should read --nylon 11--.

Column 4, line 44 reading "accodance" should read --accordance--.

Signed and Sealed this

Sixteenth Day of October 1984

[SEAL]

Attest:

Attesting Officer

GERALD J. MOSSINGHOFF

Commissioner of Patents and Trademarks